Patented Dec. 1, 1942

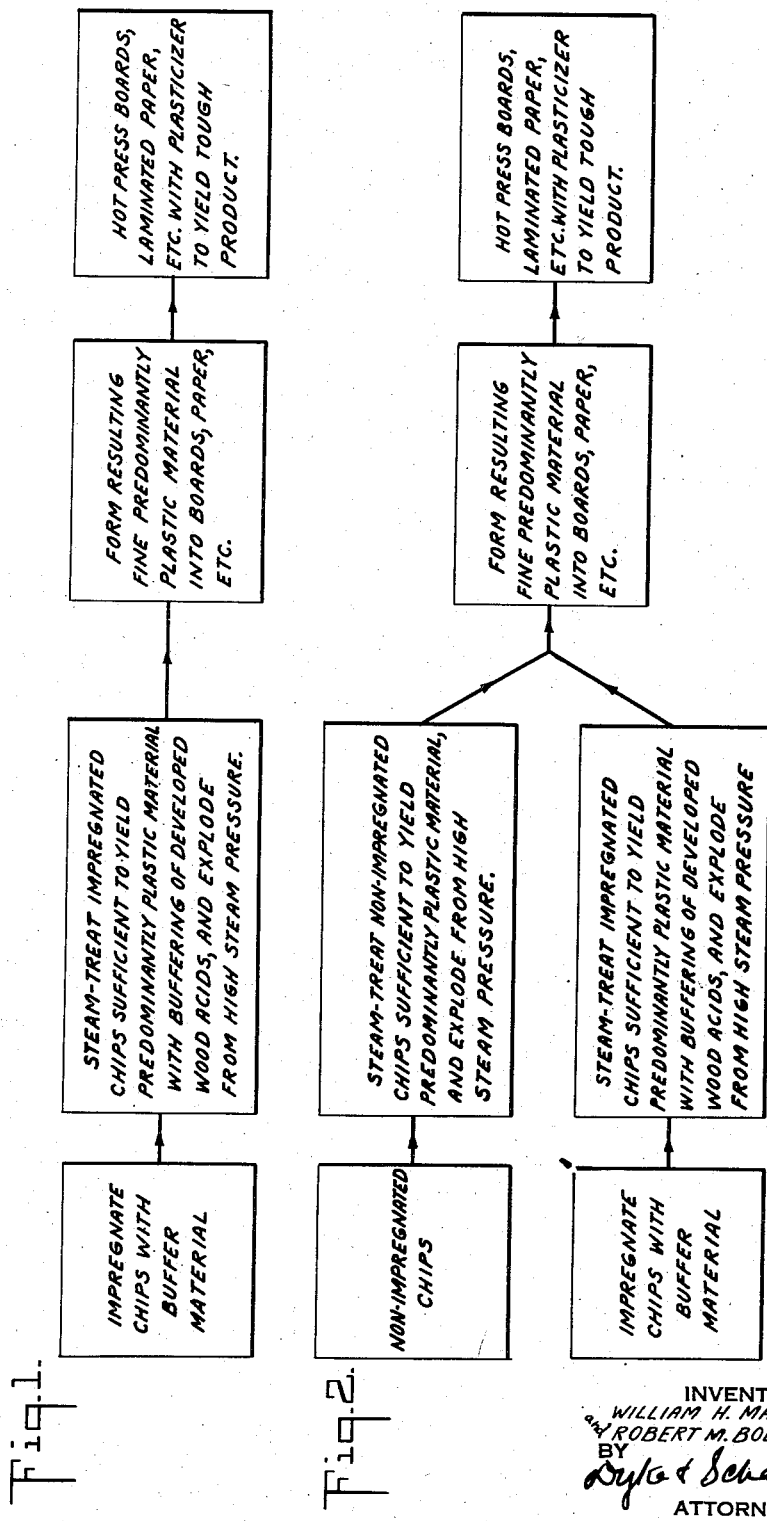

2,303,345

UNITED STATES PATENT OFFICE 2,303,345

PROCESS OF MAKING PREDOMINANTLY PLASTIC MATERIAL AND TOUGH PRODUCTS THEREOF FROM LIGNOCELLULOSE

William H. Mason and Robert M. Boehm, Laurel, Miss., assignors to Masonite Corporation, Laurel, Miss., a corporation of Delaware Application March 30, 1939, Serial No. 264,980

9 Claims. (Cl. 106—163)

Our invention relates to the making of predominantly plastic materials from wood or woody material derived from trees, cornstalks, bagasse, etc.

The expression "predominantly plastic" is used herein to signify that our materials have molding properties resembling those of molding compositions consisting of synthetic resin materials and filler materials.

It is an object of this invention to provide a process for producing predominantly plastic material adapted to be converted by heat and pressure into products which are tough or relatively free from brittle characteristics. A further object is to provide a process in which the acids, that are developed in the material by giving it a heat and pressure treatment in presence of moisture sufficient to convert the ligno-cellulose material to predominantly plastic state, are buffered as formed, and excessive reaction of the acids with the ligno-cellulose material and acid degradation thereof avoided. A further object is to provide a process in which the material for effecting such buffering action is supplied throughout the ligno-cellulose material prior to the heat treatment, as by a preliminary impregnation treatment of the ligno-cellulose material in small pieces such as chips and the like. It is a further object of the invention to provide a predominantly plastic material adapted for conversion into tough non-brittle products. Still a further object is the producing of the final products which are tough and non-brittle.

A predominantly plastic material can be made from ligno-cellulose materials such as wood chips for example by making application thereto of heat and pressure in the presence of moisture.

This can be accomplished for example by means of high pressure steam in a gun such as described in U. S. patent to Mason No. 1,824,221 to which the material is supplied in small pieces such as chips, and after heat treatment with steam the resulting material is discharged from the gun, in which it is under the high pressure, in finely divided state. The steam pressure and/or time of treatment required for making predominantly plastic material is considerably greater than is needed for making coarse fiber, as for the manufacture of hard board described in U. S. Patent No. 1,663,505 to Mason, for example.

When the relatively extensive heat treatment of ligno-cellulose material required for producing good predominantly plastic material is carried on in the absence of a preliminary impregnation treatment of the ligno-cellulose material as hereinafter described, acids such as acetic and formic acids are produced within the ligno-cellulose material being treated, causing immediate acid hydrolysis throughout the ligno-cellulose material. Excessive hydrolysis is undesirable for reasons given below. A limited amount of acid hydrolysis is desirable, however, for securing good conversion of the ligno-cellulose material to predominantly plastic state and for acting upon the easily hydrolyzable material such as hemi-cellulose with production of water solubles or water dispersibles which can be readily removed, and the water resistance of the resulting material and products correspondingly increased.

The acid hydrolysis cannot be effectively limited or reduced by subsequent neutralization of the acids, as by alkaline material added to the ligno-cellulose material after completion of the heat treatment and discharge of the material from the gun or other heat-treating apparatus, or by removal of the acids as by washing this material, for such treatments cannot be applied until the hydrolysis has gone too far for them to be of use.

If the heat and pressure treatment be reduced in order to prevent the acid hydrolysis from ever exceeding the limited desirable extent, failure to get a sufficiently complete conversion of the ligno-cellulose material to predominantly plastic state may result, and the heat-treated material discharged from the gun or other heating equipment will be raw or undercooked and lacking in the necessary plasticity and bonding power.

When sufficient heat and pressure treatment is applied to the ligno-cellulose material in presence of moisture to secure a desirably high degree of predominate plasticity, the acid hydrolysis is likely to proceed to an undesirable extent. While this will not greatly affect the breaking strength and stiffness of the products which may be made from the predominantly plastic material so obtained, it is important to be able to limit the extent of the acid hydrolysis because with too much of this action acid degradation proceeds unduly and the heat-treated material is found to be comparatively brittle or friable if examined upon removal of the moisture therefrom, and the products molded from such material are comparatively brittle or lacking in toughness. This is an objection for many uses and particularly when clean punching is a requisite, as in the making of molded breaker strips for refrigerators, for example.

The effect of getting too much acid hydrolysis upon making a sufficient application of heat and pressure to the ligno-cellulose material to get good predominate plasticity is instanced by the following example (hereinafter referred to as example without impregnation) of procedure carried on without the impregnation treatment of the present invention:

A quantity of unimpregnated gum wood chips containing about 30% of water was exploded from a gun after heat treatment for about 10 seconds with the steam at 1000 pounds per square inch (285° C.). The resulting material was quite plastic, but was also quite acid with a pH or 3.2, showing that the acid hydrolysis had proceeded further than desirable. This predominantly plastic material was formed into sheets from a water bath and excess water removed by passing through squeeze rolls. The sheets were then dried in an oven drier, and the resulting product was cooled and allowed to regain 4% moisture, to serve as a plasticizer in the subsequent hot pressing treatment. It was then pressed for 7 minutes in a flat bed press at a temperature of 175° C. and 1500 pounds per square inch pressure, and the press cooled while the sheet was under pressure. The resulting product had a specific gravity of 1.43, and a modulus of rupture of 18,000 pounds per square inch, but it was low in toughness, its impact strength being only 5 inch-pounds. It was difficult to punch cleanly either cold or hot, and a nail driven through the sheet within ¼ inch of the edge caused cracking.

We have found that by making a preliminary impregnation of the chips or pieces of wood or other ligno-cellulose material with a compound, which in itself has little or no effect on the ligno-cellulose material under the conditions of heat and pressure treatment, but which is thus made available for neutralization and buffering of the acids as formed, it is possible to make sufficient application of heat and pressure to ligno-cellulose material in the presence of moisture to get a desirably high degree of predominate plasticity, without subjecting the material to enough acid hydrolysis to cause embrittlement of the discharged mass and of products made therefrom.

Illustrations of the type of impregnating material found to operate satisfactorily are the sodium salts of carbonic acid, boric acid, silicic acid, phosphoric acid, and other acids weaker than acetic acid, or, in other words, acids which will be replaced in the salt by acetic acid and serve to at least partially neutralize acetic acid present under the temperature and pressure conditions obtaining in the gun or other apparatus for the heat treatment of the ligno-cellulose, and the reaction products whereof with acetic acid will act as a buffering agent against acid degradation. Salts of alkali metals other than sodium may be used, providing their solubilities in water are sufficiently high to get good impregnation of the chips of wood or woody material, and providing they answer the requirements of reacting with the acetic acid as formed with production of buffering agents, as for example, the potassium salts of the above mentioned acids. Such salts of metals of the alkaline earths especially calcium and magnesium may also be used.

The buffering agents formed as above described can be so provided and adjusted in quantity and potential neutralizing power that the acid hydrolysis, without being too greatly reduced, is slowed down sufficiently to avoid undue acid attack on the ligno-cellulose while the conversion of the ligno-cellulose to predominantly plastic state by heat treatment proceeds to the desired extent, and with both of these actions at substantially the optimum. Good results can be obtained with salt materials as hereinbefore described throughout a fairly wide quantity range, as for example while about 4% of sodium carbonate is preferred, about 1-8% of the sodium carbonate or equivalent can be used to good advantage, this percentage depending on the heat treatment given to the ligno-cellulose and the qualities desired in the finished products.

With use of our invention the pH of the material discharged from the gun or other heat treating device is considerably increased, affording an indication that acid hydrolysis is very considerably reduced or retarded, and the toughness of molded products made from the heat treated material is greatly increased.

In order to secure desired combinations of plasticity, strength, water resistance and toughness, we preferably combine a portion of material made with a buffer to reduce acid hydrolysis and contribute toughness together with another preferably equal portion of material made in the absence of a buffer, and which is useful in this combination because of its relatively high plasticity, even though somewhat higher in acid degradation products so that products made from this non-buffered material alone would be low in toughness. In this way desired combinations of properties may be secured and controlled within practically any desired limits.

For example an equal quantity of the same gum wood chips used in the above example without impregnation was taken, and these chips were subjected to the same treatment as before, with the following two exceptions: First, prior to their introduction into the gun, the chips were impregnated with a solution of sodium carbonate and absorbed 4% of sodium carbonate based on the dry weights of sodium carbonate and of chips; and second, the time of exposure to the heat treatment in the gun at 1000 pounds per square inch was increased from 10 seconds to 16 seconds.

This treatment held the acid hydrolysis down very considerably for the pH of the resulting exploded material was 4.8, apparently indicating that as acetic acid for example was formed it reacted with sodium carbonate to form sodium acetate and the latter served as a buffer against further degradation by acid. This conclusion is supported by the fact that after washing out the water solubles including sodium acetate an increased yield of the predominantly plastic material was obtained.

Equal quantities of this material and of the material produced from unimpregnated chips as described in the above example without impregnation were mixed in water. The pH of the resulting mixture was 4.5. After thorough admixture in water with light refining the mixture was formed into a sheet from the water bath and excess water removed by passing through squeeze rolls. The sheets were then converted into a finished product in the same way as before, namely they were dried in an oven drier and the resulting product was cooled and allowed to regain 4% moisture. It was then pressed for 7 minutes in a flat bed press at a temperature of 175° C. and 1500 pounds per square inch pressure and the press cooled while the sheet was under pressure. The resulting material had a specific gravity of 1.43. Its modulus of rupture was somewhat higher than in the example without impregnation, being 20,000 pounds per square inch. Its impact strength, however, was more than doubled, being 12 inch-pounds. This product was tough and flexible and relatively free from brittleness. It was cleanly punched into intricate shapes without difficulty. A four-penny nail was driven through it ⅛ inch from the edge but the material did not crack.

The predominantly plastic material produced with the use of buffer material as described may be used alone if desired, instead of admixed with other material. After the discharge of the material from the gun or other heating device, and with or without additions of material made without a buffer, it is preferably suspended in water and formed into sheets of any desired thickness from the water bath, the water removing most of the soluble products resulting from the reactions in the heat treatment, and the sheet may then be dried in any customary manner as by passing through an oven drier. If desired, soluble and dispersed constituents may be removed or reduced by expression treatment, as with a screw expeller, or the like, before suspension in water. After drying as in an oven drier the sheet is of approximately .7 specific gravity and may be used directly for wall board or other purposes, or it may be further consolidated in dry and heated state by passing between preferably heated rolls as described in U. S. Patent No. 2,140,189 to Mason, or, after being made into either of the sheet forms just described, or made into paper sheets, which are stacked up to get desired thickness, or in the form of molding powder, or in other forms, it may be allowed to absorb moisture, preferably about 1 to 5% moisture, and then converted to a hard dense, homogeneous, vitreous-like product of over 1.35 specific gravity and preferably over 1.40 specific gravity by pressing at elevated temperatures and pressures as described in U. S. Patent No. 2,080,078 to Mason, Boehm and Koonce, this last procedure being that followed in the above examples.

The final product in any case does not differ greatly in specific gravity, modulus of rupture, tensile strength or water resistance from the products made without buffering by preliminarily added material, but its brittleness characteristics are greatly reduced as measured by punching tests, and by tests such as hammering to measure shattering, and the impact strength is more than doubled.

When using a gun with provision for explosive discharge in which to make application of heat treatment by means of steam for conversion of the ligno-cellulose material to predominantly plastic state, a wide range of pressures and temperatures and times may be used, the time for a particular temperature and pressure being in general somewhat longer when a buffer is used than for the conversion to predominantly plastic state of ligno-cellulose material not containing buffer material.

The temperature for heat treatment should exceed the critical temperature for the particular ligno-cellulose material used, and which for gum wood is about 200° C., since with lower temperatures the times required for conversion to predominantly plastic state must be much more than ratably extended. High pressure steam can be used for the heat treatment up to practically any available pressure. About 35 minutes under pressure is needed for getting good results at 200° C. with use of 4% of sodium carbonate as buffering material, and less time is needed as the pressure and temperature is increased, as for example the time at pressure when using a buffering agent may be about 16 seconds at a pressure of 1000 pounds per square inch and the corresponding temperature of 285° C. These times are for treatment at the temperatures and steam pressures named, and do not include the time required for getting up to pressure.

We claim:

1. In the process of preparing a predominantly plastic material by subjecting ligno-cellulose material in relatively small pieces to the action of steam at a temperature of 200° C. or over and corresponding pressure for a time which is approximately 35 minutes at 200° C. to approximately 10 seconds at 285° C., and reducing the steam heated material to fineness, the step of adding to the ligno-cellulose material to be steam-treated salt of acid weak enough to be replaced by the acetic acid developed by the steam treatment of the ligno-cellulose and to buffer the developed acid and limit the attack thereof upon the ligno-cellulose material, whereby a predominantly plastic material is obtained which is adapted to be converted under heat and pressure into tough products.

2. Process as claimed in claim 1, and wherein the salt material is salt of carbonic acid.

3. Process as claimed in claim 1, and wherein the salt material is sodium carbonate.

4. Process of preparing a predominantly plastic material by subjecting ligno-cellulose material in relatively small pieces to the action of steam at a temperature of 200° C. or over and corresponding pressure for a time which is approximately 35 minutes at 200° C. to approximately 10 seconds at 285° C., and reducing the steam-treated material to fineness by explosive discharge from the region of high steam pressure, the step of adding to the ligno-cellulose material to be steam-treated salt of acid weak enough to be replaced by the acetic acid developed by the steam treatment of the ligno-cellulose and to buffer the developed acid and limit the attack thereof upon the ligno-cellulose material, whereby a predominantly plastic material is obtained which is adapted to be converted under heat and pressure into tough products.

5. Process as claimed in claim 4, and wherein the salt material is salt of carbonic acid.

6. Process as claimed in claim 4, and wherein the salt material is sodium carbonate.

7. Finely subdivided, predominantly plastic molding material adapted to be converted under heat and pressure into tough products, and consisting of ligno-cellulose which has been subjected to treatment with steam at a temperature of about 200° C. or over and corresponding pressure for a time of approximately 35 minutes at 200° C. to approximately 10 seconds at 285° C. with previous addition to the ligno-cellulose material of salt of acid weak enough to be replaced by the acetic acid developed by the steam treatment of the ligno-cellulose material and to buffer the developed acid and limit the attack of the acid thereon.

8. Material as claimed in claim 7, and wherewith previously added material was salt of carbonic acid.

9. Material as claimed in claim 7, and wherewith previously added material was sodium carbonate.

WILLIAM H. MASON.
ROBERT M. BOEHM.